(12) United States Patent
Chang et al.

(10) Patent No.: US 7,589,501 B2
(45) Date of Patent: Sep. 15, 2009

(54) APPARATUS AND METHOD FOR PROTECTING SECONDARY BATTERY

(75) Inventors: Sung Kyun Chang, Daejeon (KR); Jae Hyun Lee, Daejeon (KR); Joon Hwan Lee, Daejeon (KR); Soo Hyun Ha, Busan (KR); Sang Hoon Choy, Daejeon (KR); Jeong Ju Cho, Daejeon (KR)

(73) Assignee: LG Chem, Ltd. (KR)

( * ) Notice: Subject to any disclaimer, the term of this patent is extended or adjusted under 35 U.S.C. 154(b) by 415 days.

(21) Appl. No.: 11/361,819

(22) Filed: Feb. 24, 2006

(65) Prior Publication Data

US 2006/0197506 A1 Sep. 7, 2006

(30) Foreign Application Priority Data

Feb. 25, 2005 (KR) .................... 10-2005-0016100
Jul. 20, 2005 (KR) .................... 10-2005-0065614

(51) Int. Cl.
*H01M 10/46* (2006.01)
(52) U.S. Cl. .................................. 320/134
(58) Field of Classification Search ............. 320/132, 320/134, 136, 137, 163
See application file for complete search history.

(56) References Cited

U.S. PATENT DOCUMENTS

| | | | |
|---|---|---|---|
| 6,118,255 A | 9/2000 | Nagai et al. | |
| 6,297,618 B2 * | 10/2001 | Emori et al. | 320/132 |
| 2001/0015634 A1 * | 8/2001 | Shirakawa | 320/110 |
| 2004/0164711 A1 * | 8/2004 | Hayashi | 320/134 |

FOREIGN PATENT DOCUMENTS

| | | |
|---|---|---|
| JP | 03-191612 | 8/1991 |
| JP | 06-031345 | 4/1994 |
| JP | 06325795 | 11/1994 |
| JP | 08-308144 | 11/1996 |
| JP | 2001-159649 A | 6/2001 |
| KR | 10-1989-0013848 | 9/1989 |
| KR | 1998019304 | 6/1998 |
| KR | 1998019602 | 6/1998 |
| KR | 10-1998-0079042 | 11/1998 |
| KR | 20-2000-0010556 | 6/2000 |
| KR | 20-0195703 | 9/2000 |
| KR | 10-2003-0008610 | 1/2003 |
| KR | 100580381 | 5/2006 |

OTHER PUBLICATIONS

Office Action issued by Korean Intellectual Property Office on Mar. 13, 2008.
International Search Report dated May 26, 2006 for Application No. PCT/KR2006/000644 (All references cited in Search Report are listed above).

* cited by examiner

*Primary Examiner*—Edward Tso
(74) *Attorney, Agent, or Firm*—Cantor Colburn LLP

(57) ABSTRACT

The present invention relates to an apparatus for protecting a secondary battery by preventing overcharge of the secondary battery.

The apparatus for protecting a secondary battery includes: a secondary battery; a power supply, connected with both electrode terminals of the secondary battery, for providing a charging voltage and a charging current to the secondary battery to charge the secondary battery; and a secondary battery protection unit for shorting the power supply thereby to stop charging the secondary battery if a charging voltage of the secondary battery is above a predetermined voltage.

9 Claims, 7 Drawing Sheets

APPARATUS AND METHOD FOR PROTECTING SECONDARY BATTERY

This application claims the benefit of the filing date of Korean Patent Application Nos. 10-2005-16100 and 10-2005-65614, filed on Feb. 25, 2005 and Jul. 20, 2005, respectively, in the Korean Intellectual Property Office, the entire disclosures of which are herein incorporated by reference.

FIELD OF THE INVENTION

The present invention relates to an apparatus and a method for charging a secondary battery, and more particularly to an apparatus and a method for protecting a secondary battery by preventing an overcharge of the secondary battery.

BACKGROUND OF THE INVENTION

Generally, a battery is widely classified into a chemical battery or a physical battery, and the chemical battery may also be classified into a primary battery, a secondary battery or a fuel cell. As the secondary battery, there are a Ni—Cd secondary battery, a Ni-Mh secondary battery, an SLA (sealed lead acid) secondary battery, a Lithium ion secondary battery, a Li-polymer secondary battery, a reusable alkaline secondary battery and the like.

Particularly, when the lithium ion battery is overcharged above a given voltage, a negative reaction may occur between a cathode active material and an electrolyte. Such a negative reaction destroys the structure of the cathode active material while causing an oxidation reaction of the electrolyte. In the meantime, lithium can be deposited on an anode active material. If the voltage applied to the secondary battery continuously rises even if the secondary battery has been overcharged, accidental ignition or explosion of the secondary battery may occur.

Conventionally, in order to prevent an overcharge of the Lithium ion secondary battery, a TS (thermostat) is connected between a power supply for providing a charging power and the Lithium ion secondary battery. If a temperature of the Lithium ion secondary battery rises above a predetermined temperature due to an overcharge, the thermostat turns off thereby to stop a charging operation.

In accordance with the prior art charging of the Lithium ion secondary battery is interrupted when the Lithium ion secondary battery is overheated due to the overcharge. Accordingly, although the Lithium ion secondary battery is fully charged, charging of the Lithium ion secondary battery is not interrupted since the Lithium ion secondary battery is not overcharged yet. Therefore, a life span of the Lithium ion secondary battery may be decreased.

Further, in accordance with the prior art, whether the Lithium ion secondary battery is overcharged or not is decided based on the temperature thereof Accordingly, in case of a high-temperature environment such as a tropical region or a low-temperature environment such as a polar region, it is difficult to decide whether the Lithium ion secondary battery is overcharged or not based on the temperature thereof Therefore, under such an environment, it is difficult to protect the Lithium ion secondary battery.

Therefore, it is strongly required to develop a technology capable of preventing the overcharge of the Lithium ion secondary battery regardless of an ambient temperature; and stopping charging the Lithium ion secondary battery when the Lithium ion secondary battery is fully charged or overcharged.

SUMMARY OF THE INVENTION

Accordingly, the present invention has been made to solve the above-mentioned problems occurring in the prior art, and an object of the present invention is to provide an apparatus and a method for protecting a Lithium ion secondary battery by automatically stopping charging the Lithium ion secondary battery when the Lithium ion secondary battery is fully charged or overcharged.

Further, it is another object of the present invention to provide an apparatus and a method for protecting a Lithium ion secondary battery by preventing the overcharge of the Lithium ion secondary battery regardless of an ambient temperature.

In accordance with one aspect of the present invention, there is provided an apparatus for protecting a secondary battery, including: a secondary battery; a power supply, connected with both electrode terminals of the secondary battery, for providing a charging voltage and a charging current to the secondary battery to charge the secondary battery; and a secondary battery protection unit for shorting the power supply thereby to stop charging the secondary battery if a charging voltage of the secondary battery is above a predetermined voltage.

In the above-mentioned apparatus, the secondary battery protection unit includes: a switching device, coupled to the both electrode terminals of the secondary battery, for connecting the both electrode terminals of the secondary battery if a control current is applied; and a zener diode for providing the switching device with the control current if the charging voltage of the secondary battery is above the predetermined voltage.

Alternatively, in the above-mentioned apparatus, the secondary battery protection unit can also includes: a switching device, coupled to the both electrode terminals of the secondary battery, for connecting the both electrode terminals of the secondary battery if a control current is applied; and a varistor for providing the switching device with the control current if the charging voltage of the secondary battery is above the predetermined voltage.

In accordance with another aspect of the present invention, there is provided an apparatus for protecting a secondary battery, including: a switching device, coupled to both electrode terminals of the secondary battery, for connecting the both electrode terminals of the secondary battery if a control current is applied; and a constant voltage device for providing the switching device with the control current if the charging voltage of the secondary battery is above a predetermined voltage.

In the above-mentioned apparatus, the constant voltage device is a zener diode or a varistor.

In accordance with still another aspect of the present invention, there is provided a method for protecting a secondary battery, including the steps of: charging the secondary battery; if a charging voltage of the secondary battery is above a predetermined voltage, turning on a constant voltage device thereby to let a control current to flow into a switching device; if the control current is applied to the switching device, turning on the switching device thereby to stop charging the secondary battery.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
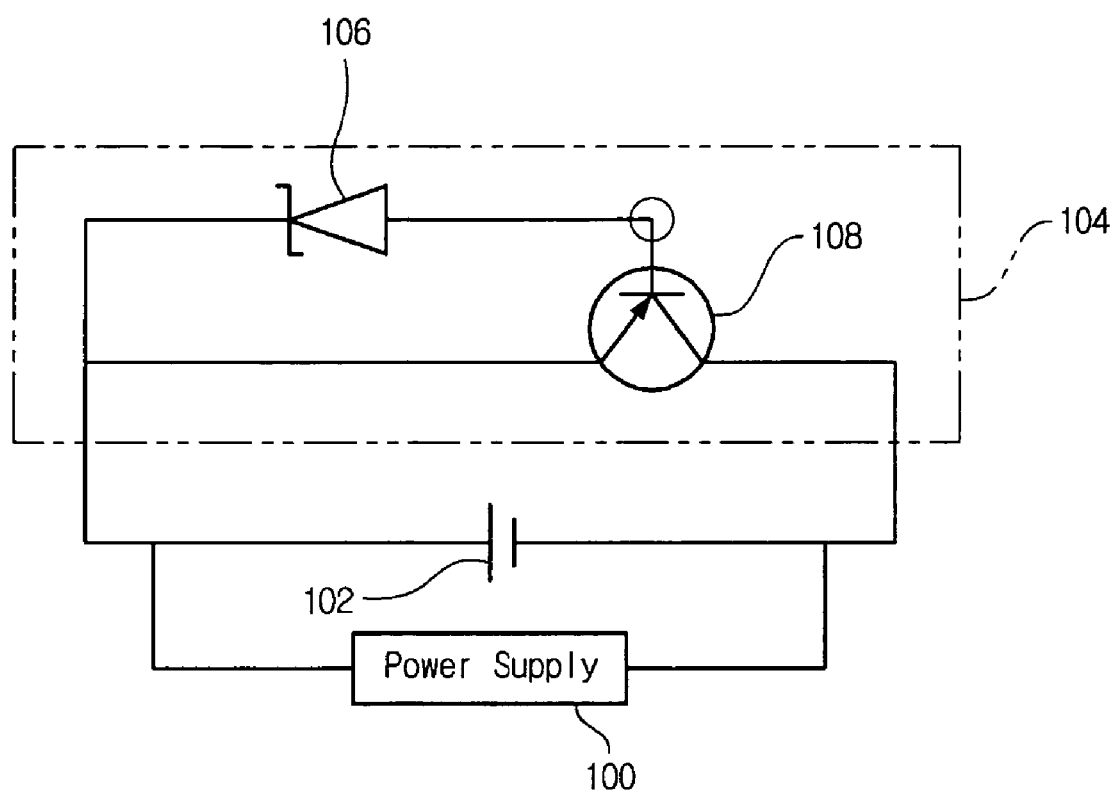
FIG. 1 is a circuit diagram of an apparatus for protecting a secondary battery in accordance with a first embodiment of the present invention.

Hereinafter, an apparatus for protecting a secondary battery in accordance with a first embodiment of the present invention will be described with reference to FIG. 1.

A power supply 100 converts a commercial electric power to a constant voltage and provides a Lithium ion secondary battery 102 with the constant voltage as a charging voltage. The power supply 100 is connected with a cathode and an anode of the Lithium ion secondary battery 102 in parallel.

The Lithium ion secondary battery 102 is charged by the charging voltage provided by the power supply 100.

A secondary battery protection unit 104 is connected to the Lithium ion secondary battery 102 in parallel. The secondary battery protection unit 104 includes a zener diode 106 as a constant voltage device and a transistor 108 as a switching device. The zener diode 106 is connected between the cathode of the Lithium ion secondary battery 102 and a base terminal of the transistor 108. An emitter terminal and a collector terminal of the transistor 108 are connected with the cathode and the anode of the Lithium ion secondary battery 102.

If a voltage not less than a breakdown voltage is applied to the zener diode 106, the zener diode 106 let a current flow, which is referred as the zener effect. Accordingly, in order to let the current flow through the zener diode 106 when the Lithium ion secondary battery 102 is fully charged or overcharged, the zener diode 106 having a breakdown voltage corresponding to the fully-charged voltage or the overcharged voltage of the Lithium ion secondary battery 102 is selected or a voltage dividing circuit including a resistor and the like can be added to the zener diode 106.

Although the zener diode 106 is employed as a device allowing the current to flow when the Lithium ion secondary battery 102 is fully charged or overcharged in FIG. 1, a varistor can also be adopted.

Further, though the PNP transistor 108 is employed as a switching device in FIG. 1, various kinds of transistors which turn on when a current is applied to a base terminal thereof can be adopted. For example, it will be understood by those skilled in the art that an NPN transistor and an FET as well as the PNP transistor may be employed as the transistor 108 shown in FIG. 1.

Figure 2:
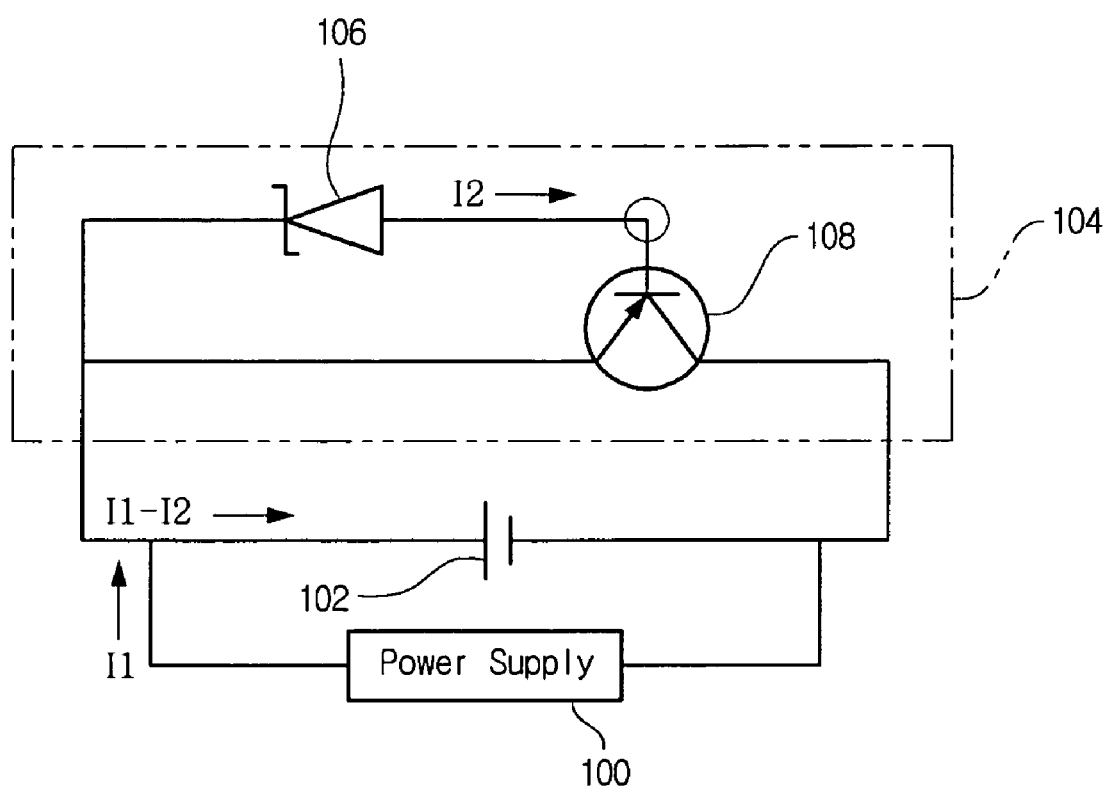
FIGS. 2 and 3 are circuit diagrams showing current flows in the secondary battery protection apparatus show in FIG. 1.
Figure 3:
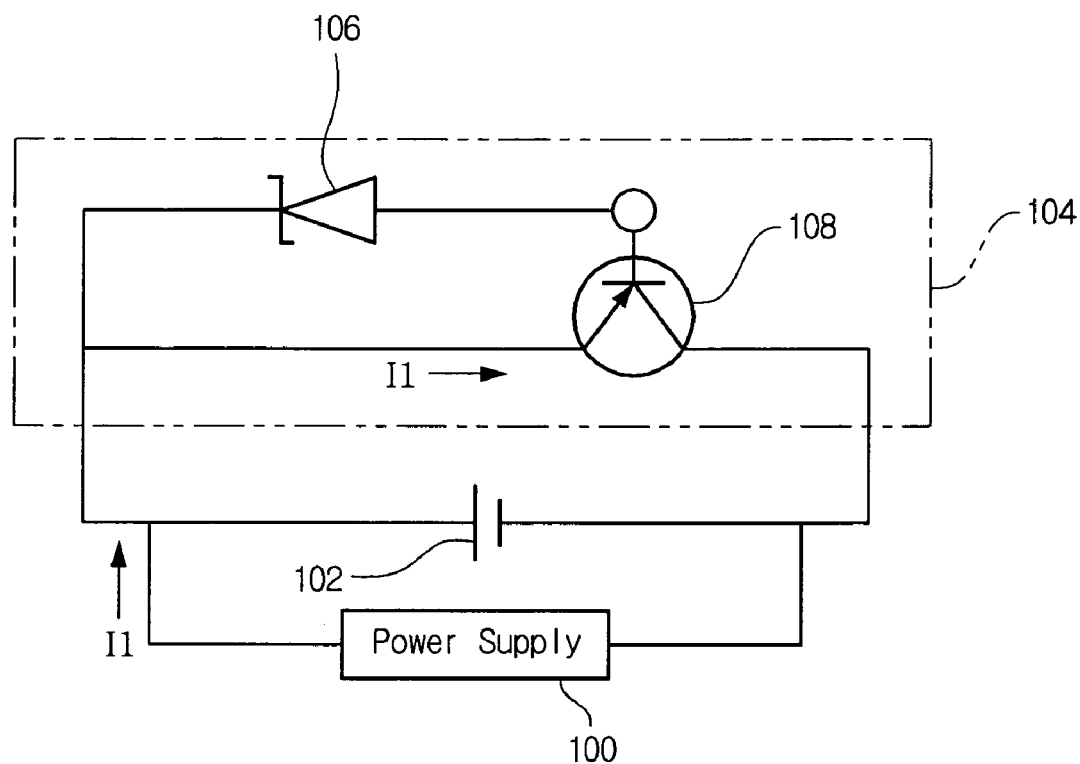

Hereinafter, an operation of the apparatus for protecting a secondary battery in accordance with the first embodiment of the present invention will be described with reference to FIGS. 2 and 3.

The power supply 100 provides a charging voltage and then a charging current I1 flows. The charging current I1 is supplied to the zener diode 106 and the Lithium ion secondary battery 102. That is, an actual charging current I3 which is equal to (I1-I2) is provided to the Lithium ion secondary battery 102, wherein I1 is the charging current and I2 is a zener current provided to the zener diode 106.

If a charging voltage of the Lithium ion secondary battery 102, which is charged by the actual charging current I3, is equal to the fully charged voltage or the overcharged voltage thereof, the zener diode 106 allows a current to flow as a control current and then the control current flows into the base terminal of the transistor 108. If the control current flows into the base terminal of the transistor 108, the transistor 108 turns on and then shorts both electrode terminals of the power supply 100. Accordingly, the charging current is not supplied to the Lithium ion secondary battery 102.

As mentioned above, by using the secondary battery protection unit 104 with a simple structure including the zener diode or the varistor and the transistor, the first embodiment of the present invention automatically stops charging the Lithium ion secondary battery when the Lithium ion secondary battery is fully charged or overcharged Further, since it is decided whether the Lithium ion secondary battery is overcharged or not based on the charging voltage thereof, the overcharge of the Lithium ion secondary battery can be prevented regardless of an ambient temperature.

Hereinafter, an apparatus for protecting a secondary battery in accordance with a second embodiment of the present invention will be described with reference to FIG. 4.

A power supply 200 converts a commercial electric power to a constant voltage and provides a Lithium ion secondary battery 202 with the constant voltage as a charging voltage. The power supply 200 is connected with a cathode and an anode of the Lithium ion secondary battery 202 in parallel.

The Lithium ion secondary battery 202 is charged by the charging voltage provided by the power supply 200.

A secondary battery protection unit 204 is connected to the Lithium ion secondary battery 202 in parallel. The secondary battery protection unit 204 includes a zener diode 206 as a constant voltage device and an SCR (silicon controlled rectifier) 208 as a switching device. The zener diode 206 is connected between the cathode of the Lithium ion secondary battery 202 and a gate terminal of the SCR 208. An emitter terminal and a collector terminal of the SCR 208 are connected with the cathode and the anode of the Lithium ion secondary battery 202.

If a voltage not less than a breakdown voltage is applied to the zener diode 206, the zener diode 206 let a current flow, which is referred as the zener effect. Accordingly, in order to let the current flow through the zener diode 206 when the Lithium ion secondary battery 202 is fully charged or overcharged, the zener diode 206 having a breakdown voltage corresponding to the fully-charged voltage or the overcharged voltage of the Lithium ion secondary battery 202 is selected or a voltage dividing circuit including a resistor and the like can be added to the zener diode 206.

Figure 4:
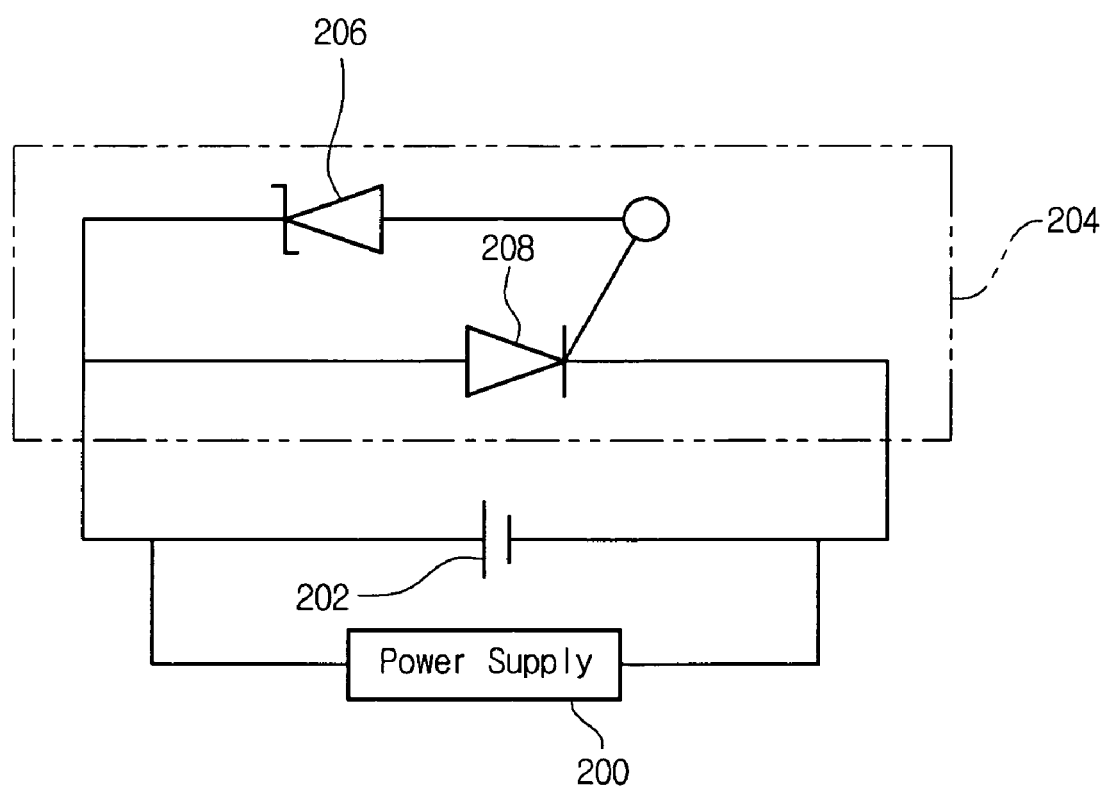
FIG. 4 is a circuit diagram of an apparatus for protecting a secondary battery in accordance with a second embodiment of the present invention.

Although the zener diode 206 is employed as a constant voltage device allowing the current to flow when the Lithium ion secondary battery 202 is fully charged or overcharged in FIG. 4, a varistor can also be adopted.

Further, though the SCR 208 is employed as a switching device in FIG. 4, various kinds of switching devices which turn on when a current is applied to a gate terminal thereof can be adopted. For example, it will be understood by those skilled in the art that an N-Type SCR, a dual gate SCR, a TRIAC, a GTO (gate turn off) SCR and the like may be employed as a switching device.

Figure 5:
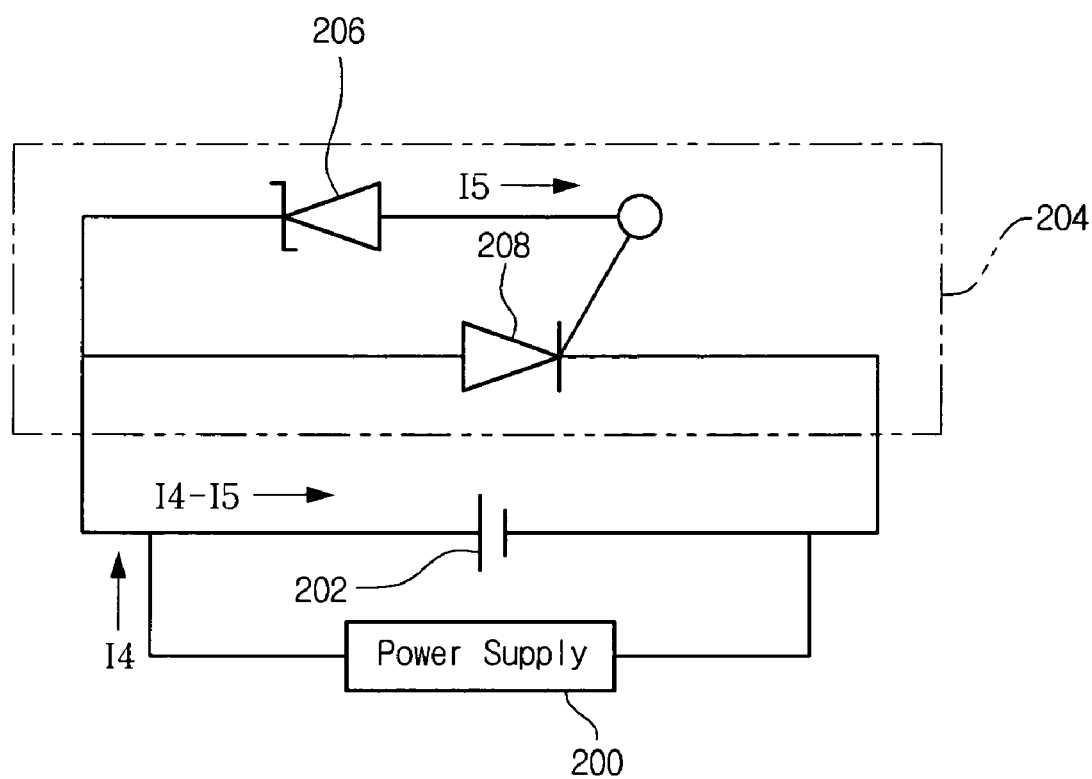
FIGS. 5 and 6 are circuit diagrams showing current flows in the secondary battery protection apparatus show in FIG. 4.
Figure 6:
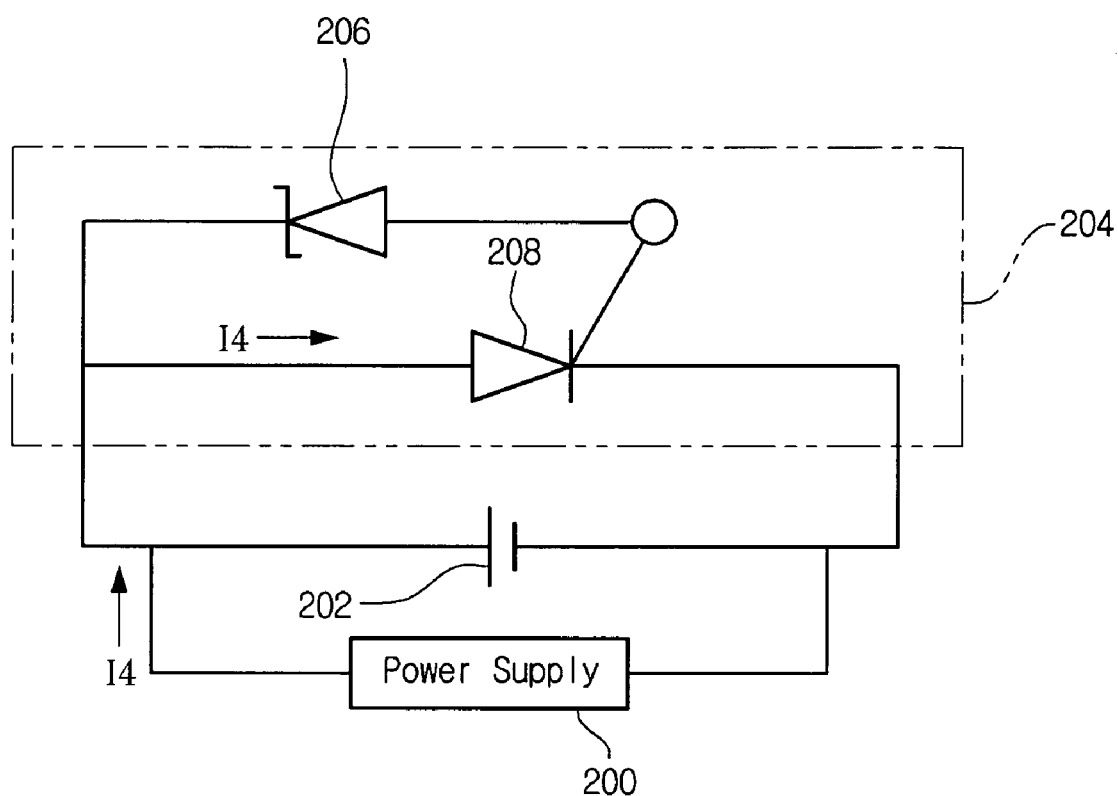

Hereinafter, an operation of the apparatus for protecting a secondary battery in accordance with the second embodiment of the present invention will be described with reference to FIGS. 5 and 6.

The power supply 200 provides a charging voltage and then a charging current I4 flows. The charging current I4 is supplied to the zener diode 206 and the Lithium ion secondary battery 202. That is, an actual charging current I6 which is equal to (I4-I5) is provided to the Lithium ion secondary battery 202, wherein I4 is the charging current and I5 is a zener current provided to the zener diode 206.

If a charging voltage of the Lithium ion secondary battery 202, which is charged by the actual charging current I6, reaches to the fully charged voltage or the overcharged voltage thereof, the zener diode 206 allows a current to flow as a control current and the control current flows into the gate terminal of the SCR 208. If the control current flows into the gate terminal of the SCR 208, the SCR 208 turn on and then shorts both electrode terminals of the power supply 200. Accordingly, the charging current is not supplied to the Lithium ion secondary battery 202.

Figure 7:
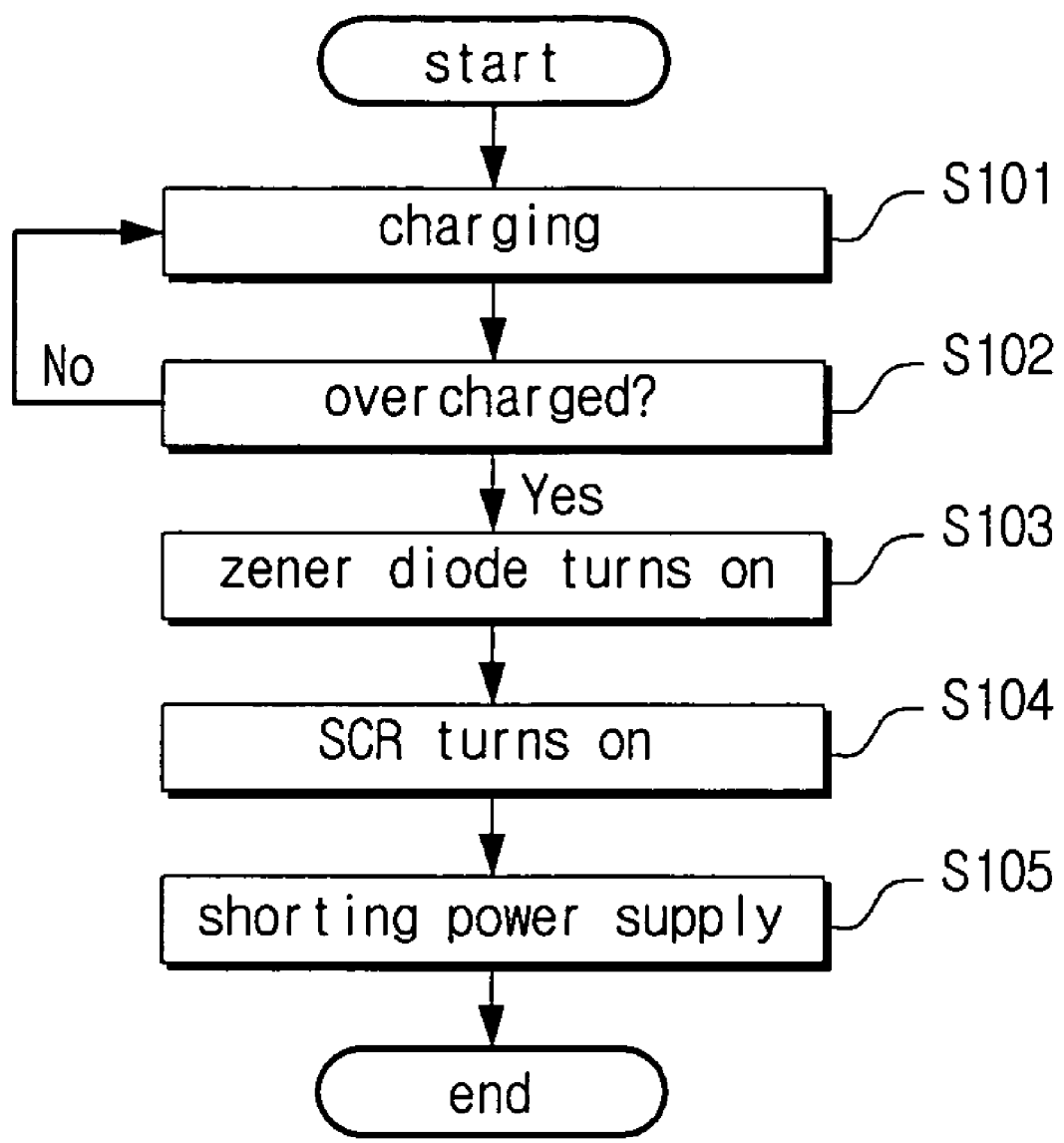
FIG. 7 is a flow chart for illustrating an operation of the apparatus for protecting a secondary battery in accordance with the second embodiment of the present invention.

FIG. 7 is a flow chart for illustrating an operation of the apparatus for protecting a secondary battery in accordance with the second embodiment of the present invention.

The power supply 200 provides a charging voltage and a charging current to the Lithium ion secondary battery 202 (S101). If the charging voltage of the Lithium ion secondary battery 202 is lower than the breakdown voltage of the zener diode 206 (S102), the zener diode 206 does not allow a current to flow through the zener diode 206 and the Lithium ion secondary battery 202 is charged continuously.

If the charging voltage of the Lithium ion secondary battery 202 is equal to the breakdown voltage of the zener diode 206 (S102), the zener diode 206 turns on (S103). Accordingly, the zener diode 206 let a control current to flow into the gate terminal of the SCR 208.

If the control current is applied into the gate terminal of the SCR 208, the SCR 208 turns on (S104). Then, both electrode terminals of the power supply 200 are shorted (S105).

Accordingly, charging the Lithium ion secondary battery 202 is interrupted.

As mentioned above, by using the secondary battery protection unit 204 with a simple structure including the zener diode or the varistor and the SCR, the second embodiment of the present invention automatically stops charging the Lithium ion secondary battery when the Lithium ion secondary battery is fully charged or overcharged.

Further, since it is decided whether the Lithium ion secondary battery is overcharged or not based on the charging voltage thereof, the overcharge of the Lithium ion secondary battery can be prevented regardless of an ambient temperature.

While the invention has been shown and described with respect to the preferred embodiments, it will be understood by those skilled in the art that various changes and modifications may be made without departing from the spirit and the scope of the invention as defined in the following claims.

What is claimed is:

1. An apparatus for protecting a secondary battery, the apparatus comprising:
   a secondary battery;
   a power supply, connected to electrode terminals of the secondary battery for providing a charging voltage and a charging current to the secondary battery to charge the secondary battery; and
   a secondary battery protection unit connected to electrode terminals of the power supply,
   wherein the secondary battery protection unit shorts the electrode terminals of the power supply to stop charging the secondary battery if the charging voltage of the secondary battery is above a predetermined voltage.

2. The apparatus of claim 1, wherein the secondary battery protection unit includes:
   a switching device, coupled to the electrode terminals of the secondary battery, for connecting the electrode terminals of the secondary battery together if a control current is applied to the switching device; and
   a zener diode for providing the switching device with the control current if the charging voltage of the secondary battery is above the predetermined voltage.

3. The apparatus of claim 1, wherein the secondary battery protection unit includes:
   a switching device, coupled to the electrode terminals of the secondary battery, for connecting the electrode terminals of the secondary battery together if a control current is applied to the switching device; and
   a varistor for providing the switching device with the control current if the charging voltage of the secondary battery is above the predetermined voltage.

4. The apparatus of claim 2, wherein the switching device is an NPN transistor or a PNP transistor.

5. The apparatus of claim 3, wherein the switching device is an NPN transistor or a PNP transistor.

6. The apparatus of claim 1, wherein the predetermined voltage is a fully charged voltage or an overcharged voltage of the secondary battery.

7. An apparatus for protecting a secondary battery, the apparatus comprising:
   a switching device coupled to electrode terminals of the secondary battery; and
   a constant voltage device for providing the switching device with a control current if a charging voltage of the secondary battery is above a predetermined voltage,
   wherein the switching device connects the electrode terminals of the secondary battery together when the control current is applied to the switching device.

8. The apparatus of claim 7, wherein the constant voltage device is a zener diode or a varistor.

9. The apparatus of claim 7, wherein the switching device is one of an SCR (silicon controlled rectifier), an N-Type SCR, a dual gate SCR, a TRIAC and a GTO (gate turn off) SCR.

* * * * *